US005518334A

United States Patent [19]

Yagi et al.

[11] Patent Number: 5,518,334

[45] Date of Patent: May 21, 1996

[54] HINGE CONNECTING MECHANISM

[75] Inventors: Sakai Yagi; Masanori Tsuji; Motohisa Kashiyama, all of Shizuoka, Japan

[73] Assignee: Yazaki Corporation, Tokyo, Japan

[21] Appl. No.: 87,297

[22] Filed: Jul. 8, 1993

[30] Foreign Application Priority Data

Jul. 8, 1992 [JP] Japan .................................... 4-203207

[51] Int. Cl.[6] ............................ F16C 11/04; H01R 13/46

[52] U.S. Cl. .......................... 403/291; 439/595; 439/752; 220/334

[58] Field of Search ................................ 403/41, 65, 66, 403/68, 70, 291; 439/595, 596, 752; 16/225, DIG. 13; 220/375, 334, 339

[56] References Cited

U.S. PATENT DOCUMENTS

| | | | |
|---|---|---|---|
| 3,332,053 | 7/1967 | Busler | 439/596 |
| 4,045,112 | 8/1977 | Rodondi et al. | 439/595 |
| 4,060,100 | 11/1977 | Miller et al. | 220/375 |
| 4,711,508 | 12/1987 | Sueyoshi | 439/595 |
| 4,721,482 | 1/1988 | Fukuda et al. | 439/595 |
| 5,106,326 | 4/1992 | Tsuji et al. | 439/596 |

FOREIGN PATENT DOCUMENTS 62-82575 5/1987 Japan .

*Primary Examiner*—Richard A. Bertsch
*Assistant Examiner*—William Wicker
*Attorney, Agent, or Firm*—Sughrue, Mion, Zinn, Macpeak & Seas

[57] ABSTRACT

Disclosed is a hinge connecting mechanism for connecting a connector housing to a lid in a hinged fashion via a hinge portion integrally molded with the connector housing with a small thickness. The hinge connecting mechanism assures that a malfunction does not arise where the hinge portion is undesirably broken or torn away from the container as the lid is repeatedly opened and closed. A plate member connected to a connector housing in a hinged fashion includes a hinge extension having the same width as that of a hinge portion, while extending in continuation from the hinge portion. The hinge extension is formed on a surface of the plate member adapted to face an upper wall of the connector housing when the plate member is closed.

8 Claims, 2 Drawing Sheets

HINGE CONNECTING MECHANISM

BACKGROUND OF THE INVENTION

1. Field of the Invention

The present invention relates to a hinge connecting mechanism employable for a container having a lid integrally attached thereto wherein the lid and a housing of the container are molded integral with each other via a hinge portion having a small thickness.

2. Prior art

As is well known, containers molded of material such as plastic, rubber or the like, while having a lid integrally attached thereto, are put into practical use in many industrial fields. With the containers each having a lid integrally attached thereto, it is possible to mold each of the containers in an integral structure by employing an injection molding process using an injection molding die. This has the advantageous effect that the containers can be produced at a reduced cost by using a mass production line. For this reason, the containers, each having a lid integrally attached thereto, are practically used in wide variety of applications ranging from containers having intricate structures to containers having simple structures.

Not only compressible stress, but also tensile stress arise in a hinge portion employed for a container of the foregoing type having a lid integrally attached thereto when the hinge portion is rotated and expanded as the lid is opened and closed. In the above circumstances, the hinge portion is usually designed to have a small thickness in order to enlarge a radius of curvature of the hinge portion at the time of bending thereof, so as to sufficiently withstand the compressible stress and the tensile stress which arise in the hinge portion when the lid is opened and closed.

Containers of the foregoing type, each having a lid integrally attached thereto, are shown by a connector used for achieving electrical connection therewith as disclosed in Unexamined Japanese Utility Model Publication No. Sho 62-82575. A plate member (serving as a lid) molded integral with a connector housing via a hinge portion is doubly engaged with an electrode terminal received in the connector housing. Improved reliability with respect to the electrical connection is achieved by eliminating any possibility that the electrode terminal can become disconnected from the connector housing in the rearward direction.

A typical conventional connector of the foregoing type is described below with reference to FIG. 4.

As shown in FIG. 4, a connector housing 1 having a terminal accommodating chamber 2 formed therein includes a plate member 9 on an upper wall 3 thereof. The plate member 9 is connected in a hinged fashion to the upper wall 3 via an elastic hinge portion 4 having a small thickness while a terminal fixing member 5 is disposed at the free end of the plate member 9. In addition, a rectangular opening portion 6 is formed through the upper wall 3 of the connector housing 1 so as to allow the terminal fixing member 5 to be inserted into the terminal accommodating chamber 2 therethrough. When an electrode terminal 11 is assembled with the connector housing 1, it is first inserted into the terminal accommodating chamber 2 from the rear side of the connector housing 1. Subsequently, a flexible engagement lance (not shown) disposed in the terminal accommodating chamber 2 is engaged with a hole (not shown) formed through the rear surface of the electrode terminal 11. Thereafter, the plate member 9 is rotated in a direction marked by arrow f, so that the terminal fixing member 5 is inserted into the terminal accommodating chamber 2 through the rectangular opening portion 6 until holding projections *5b* and *5c* projecting outside of the terminal fixing member 5 are engaged with an inner surface *3a* of the upper wall 3 along a front edge *3b* of the rectangular opening portion 6. With this construction, the electrode terminal 11 inserted into the terminal accommodating chamber 2 is doubly engaged with the connector housing 1. This is because a terminal fixing face *5a* of the terminal fixing member 5 is brought in engagement with a rear end surface *11d* of an electrical contact member *11c* of the electrode terminal 11.

Upon completion of the assembling operation, set forth above, the intensity of the terminal holding power for firmly holding the electrode terminal 11 in connector housing 1, is substantially increased. This increased intensity is caused by addition of the terminal holding power derived from the engagement lance and the terminal holding power derived from the terminal fixing member 5, resulting in the increased reliability of the connector with respect to the electrical connection between the connector housing 1 and the electrode terminal 11.

With the conventional connector constructed in the above-described manner, however, a malfunction arises when the plate member 9 is rotated in the direction marked by arrow f, so as to be engaged with the connector housing 1 while the holding projection *5c* of the terminal fixing member 5 is engaged with the front edge *3b* of the rectangular opening portion 6. The malfunction arises because of the considerably high intensity of the power required for raising up the plate member 9 is concentratively applied to the hinge portion 4. This is due not only because of the small thickness of the hinge portion 4, but also because of the short length between the connector housing 1 and the plate member 9. This results in the hinge portion 4 being undesirably broken or torn away from the connector housing 1. It should be noted that when a certain intensity of exterior power, effective for drawing the electrode terminal 11 away from the connector housing 1 in the direction marked by the arrow F, is applied to the electrode terminal 11, the power acting on the hinge portion 6 is intensified by the terminal holding power of the terminal fixing member 5 which effectively stands against the exterior power so as to prevent the electrode terminal 11 from being disconnected from the terminal housing 1 in the rearward direction.

SUMMARY OF THE INVENTION

The present invention has been made in consideration of the aforementioned background and its object resides in providing a hinge connecting mechanism employable for a container having a lid attached thereto via a hinge portion integrally molded therewith. The hinge portion has a small thickness, wherein the hinge connecting mechanism prevents a malfunction in which the hinge portion is undesirably broken or torn away from the container.

To accomplish the above object, the present invention provides a hinge connecting mechanism for connecting a housing to a lid in a hinged manner via a flexible hinge portion integrally molded with the housing. The flexible hinge portion has a small thickness, wherein the hinge connecting mechanism is characterized in that a hinge extension is formed on the housing or the lid having the same small thickness as that of the hinge portion, while extending in continuation from the hinge portion.

With the hinge connecting mechanism constructed in the above-described manner, since the hinge extension, which has a width substantially the same as that of the hinge portion, is formed on the housing or the lid with the same thickness as that of the hinge portion and extending in continuation from the hinge portion, the power applied to the hinge portion via the lid when the latter is rotated in the closing direction can be distributed over the hinge extension to which the foregoing power is transmitted. Thus, the malfunction does not arise in which the hinge portion is undesirably broken or torn away from the housing.

DETAILED DESCRIPTION OF THE PREFERRED EMBODIMENTS

The present invention will now be described in detail hereinafter with reference to the accompanying drawings.

Figure 1:
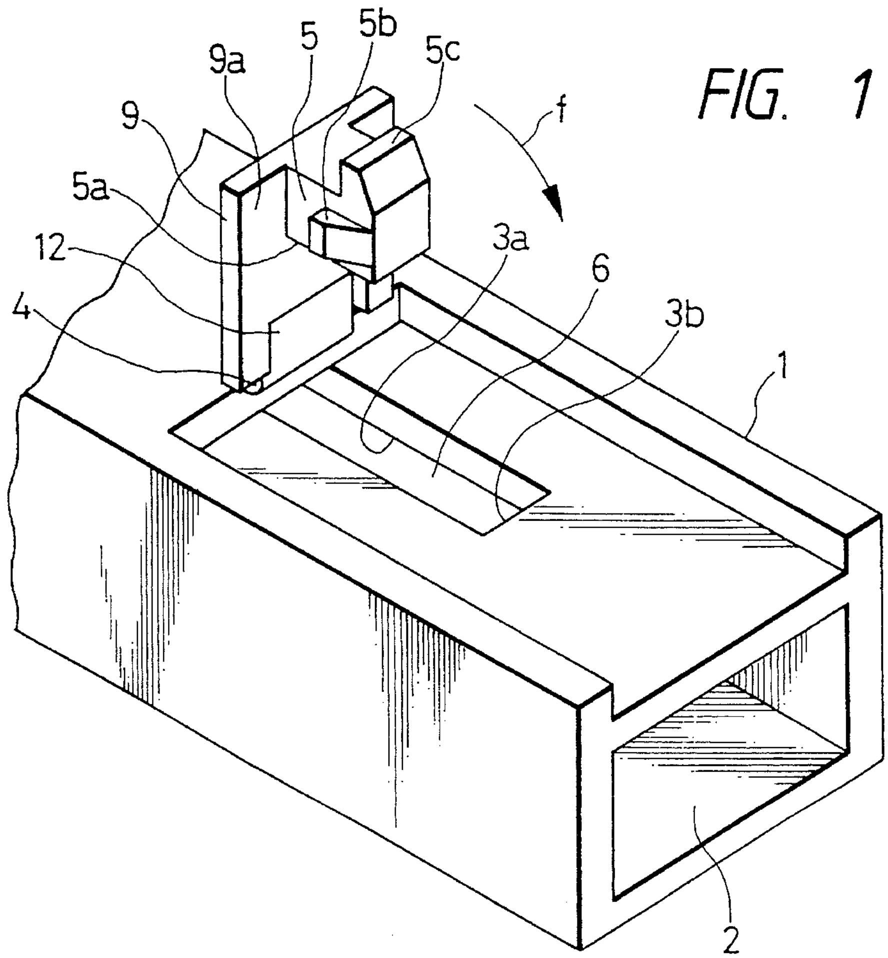
FIG. 1 is a perspective view of a connector housing of one embodiment of the present invention.
Figure 2:
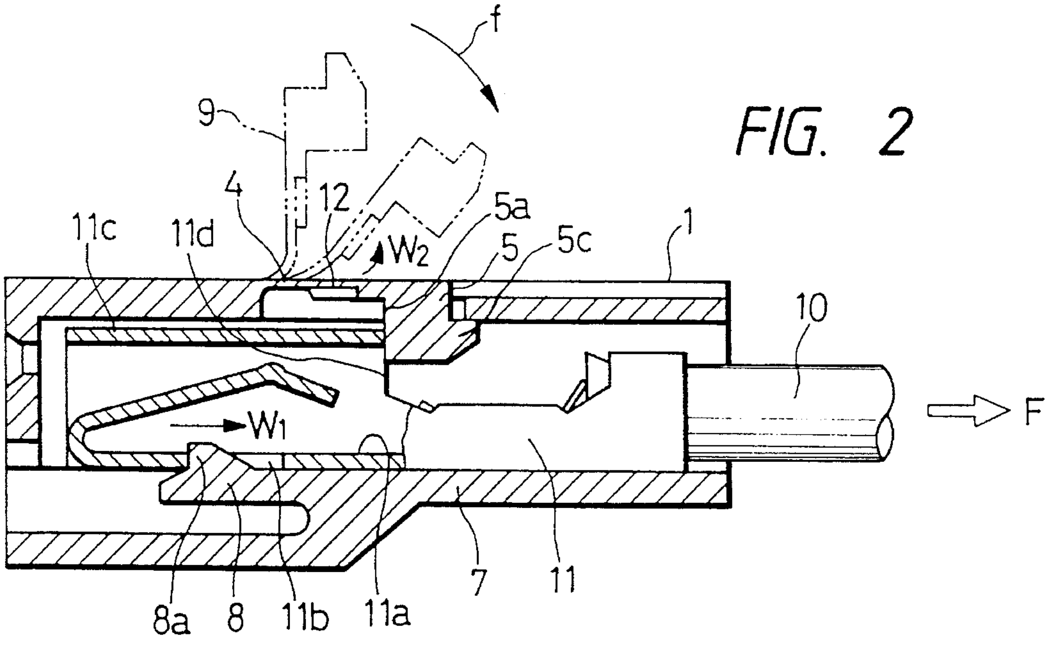
FIG. 2 is a vertical sectional view of the connector housing shown in FIG. 1.

FIG. 1 is a perspective view of a connector housing including a hinge connecting mechanism constructed according to a first embodiment of the present invention. FIG. 1 particularly illustrates essential components constituting the hinge connecting mechanism. FIG. 2 is a vertical sectional view of the connector housing shown in FIG. 1, which particularly illustrates the state in which an electrode terminal is inserted into the connector housing.

It should be noted that the same components as those constituting the conventional connector housing described above with reference to FIG. 4 are represented by the same reference numerals.

Figure 4:
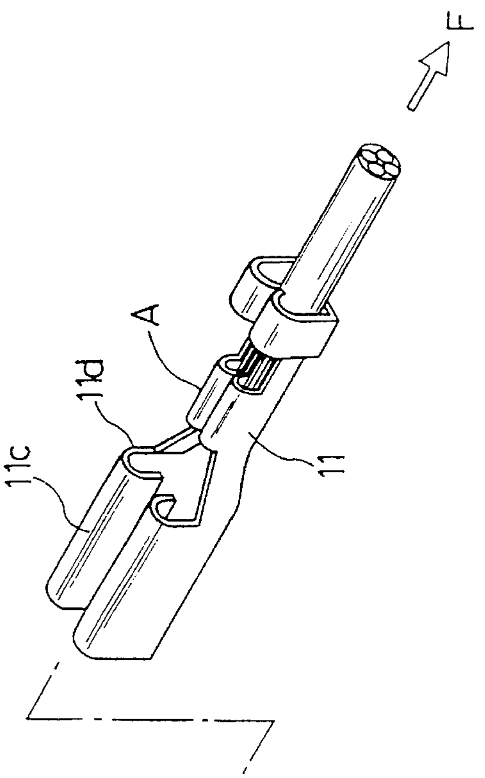
FIG. 4 PRIOR ART
FIG. 4 is a perspective view of a connector housing of a conventional hinge connecting mechanism.
Figure 4:
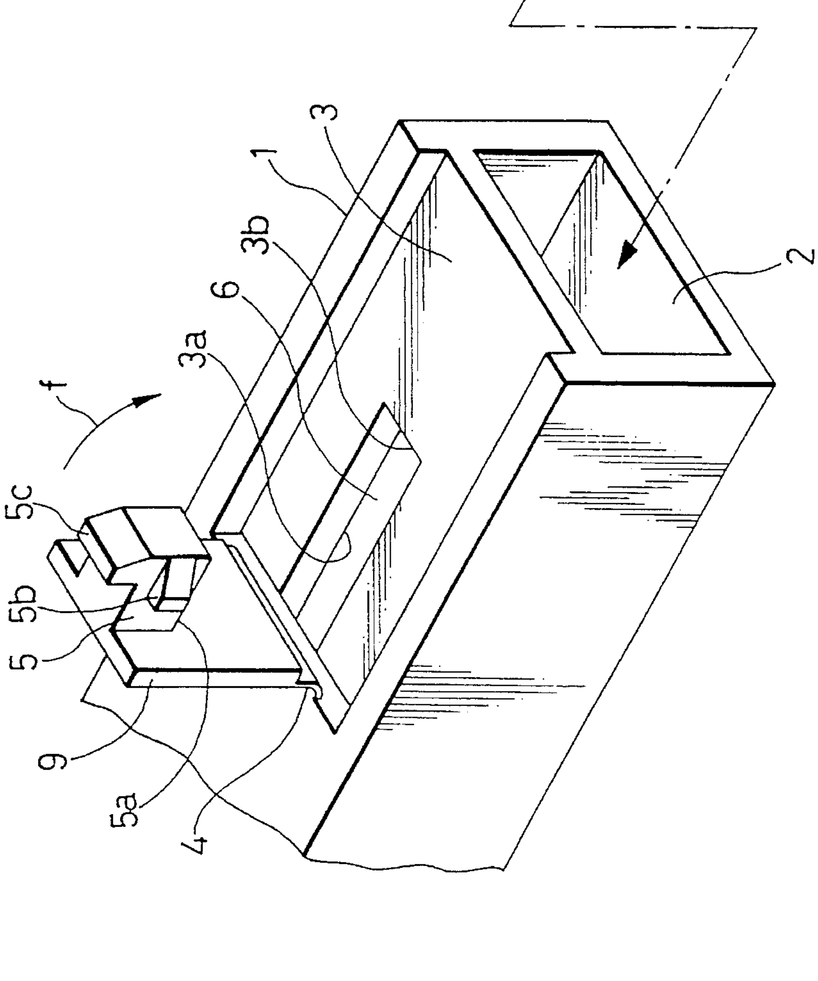
FIG. 4 PRIOR ART

As shown in the drawings, the connector is identical to the conventional connector shown in FIG. 4 in respect of the facts that a plate member 9 is connected to an upper surface 3 of a connector housing 1 in a hinged fashion, having a terminal accommodating chamber 2 formed therein, via an elastic hinge portion 4 having a small thickness. A terminal fixing member 5 is disposed at the free end of the plate member 9. A rectangular opening portion 6 is formed through the upper wall 3 of the connector housing 1 so as to allow the terminal fixing member 5 to be inserted into the terminal accommodating chamber 2 through the rectangular opening portion 6. Holding projections *5b* and *5c* projecting outside of the terminal fixing member 5 are engaged with an inner surface *3a* of the upper wall 3 along a front edge *3b* of the rectangular opening portion 6. As shown in FIG. 2, a terminal fixing face *5a* of the terminal fixing member 5 is brought in engagement with a rear end surface lid of a terminal 11 inserted into the terminal accommodating chamber 2 so as to prevent the terminal 11 from being disconnected from the connector housing 1 in the rearward direction. A flexible engagement lance 8 is molded integral with a bottom wall 7 of the connector housing 1 so that it is engaged with a hole *11b* formed through a terminal base plate *11a* of the connector housing 1 so as to allow the terminal 11 to be fixedly held in the terminal accommodating chamber 2 of the connector housing 1.

According to the present invention, the plate member 9 is connected to the hinge portion 4 in a hinged fashion and includes a hinge extension 12 having the same width and the same small thickness as that of the hinge portion 4 while extending in continuation from the hinge portion 4. When the plate member 9 is closed, the hinge extension 12 is caused to face to the upper wall 3 of the connector housing 1.

Specifically, the hinge portion 4 is formed to have a small thickness compared with the thickness of the connector housing 1 or the plate member 9 so as to satisfactorily stand against the compressible stress and the tensile stress induced when the plate member 9 is opened and closed, in the same manner as does the conventional hinge connecting mechanism, as described above with reference to FIG. 4. The hinge extension 12 is molded integral with the hinge portion 4 while having the same small thickness as that of the hinge portion 4.

Next, an operation for assembling a terminal in the connector housing constructed in the above-described manner is performed in the same manner as the aforementioned conventional connector housing. Specifically, the terminal 11 crimped on a cable 10 is inserted into the terminal accommodating chamber 2. Subsequently, a flexible engagement lance 8 projecting in the forward direction relative to the terminal accommodating chamber 2 is firmly fitted into a hole *11b* formed through a base plate *11a* of the terminal 11. Thereafter, the plate member 9 is closed in the 10 direction marked by arrow f so that holding projections *5b* and *5c* (two holding projections similar to *5b* as shown in FIG. 1) are brought in engagement with an inner surface *3a* of the upper wall 3 after they pass through the rectangular opening portion 6. Whereby, a terminal fixing face *5a* of the terminal fixing member 5 is engaged with the rear end surface *11d* of the terminal 11.

When the holding projection *5c* on the terminal fixing member 5 is engaged with a front edge *3b* of the rectangular opening portion 6 by turning the plate member 9 in the closing direction, the plate member 9 acts on the hinge portion 4 in such a manner so as to compress the hinge portion 4. This causes the hinge portion 4 to be raised up from the connector housing 1. At this time, however, the power applied to the hinge portion 4 by the plate member 9 is not concentrated only on the hinge portion 4, as with the conventional hinge connecting mechanism, rather the power is also transmitted to the hinge extension 12 having an area larger than that of the hinge portion 4 and having the same small thickness as that of the hinge portion 4 so that the power is uniformly distributed over the hinge extension 12. As a result, a malfunction does not occur in which the hinge portion 4 is undesirably broken or torn away from the connector housing 1. It should be noted that a part of the power applied to the hinge portion 4 by the plate member 9 is derived from a terminal holding power $W_2$ of the terminal fixing member 5, as shown in FIG. 2, but it likewise is distributed over the hinge extension 12.

The present invention has been described above with respect to the embodiment wherein the terminal 11 is doubly engaged with the connector housing 1. It should of course be understood that the present invention should not be limited only to the terminal connecting mechanism of the foregoing type employable for the housing 1. Rather, the present invention may be equally applied to any type of terminal connecting mechanism for connecting a container housing to a lid in a hinged fashion via a flexible hinge portion having a small thickness.

Figure 3:
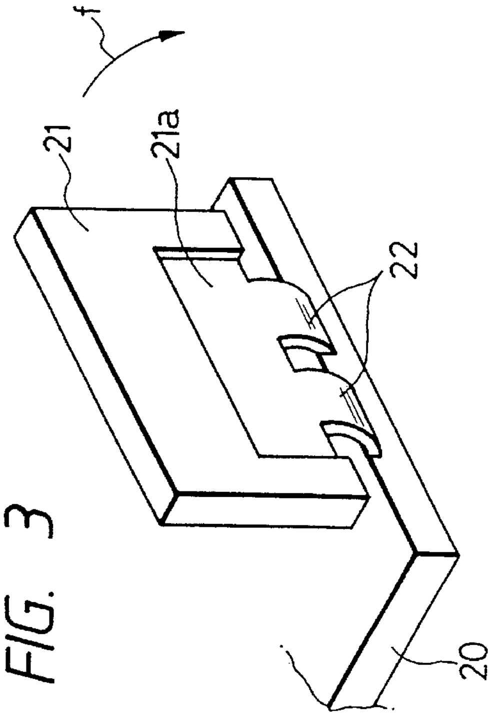
FIG. 3 is a fragmentary perspective view of a hinge connecting mechanism of another embodiment of the present invention.

FIG. 3 shows by way of a fragmentary perspective view, a hinge portion of a terminal connecting mechanism constructed according to a second embodiment of the present invention. As shown in the drawing, a lid 21 is connected to a container 20, in a hinged fashion via a flexible hinge portion 22 having a small thickness. The hinge portion 22 is designed in the form of a pair of connecting bands each extending from the container 20. Specifically, the lid 21 molded integral with the container 20 includes a hinge extension 21*a* having substantially the same width as that of the hinge portion 22 while extending in continuation from the hinge portion 22. The hinge extension 21*a* is designed to have the same small thickness as that of the hinge portion 22, in the same manner as the first embodiment of the present invention, as described above with reference to FIG. 1 and FIG. 2.

With the hinge connecting mechanism constructed with the hinge portion integrally attached thereto, in the above-described manner, when power, effective for raising up the lid 21 from the container 20 while compressing the hinge portion 22 therewith with an operator's hand, is generated when the lid 21 is turned in the direction marked by arrow f as shown in FIG. 3, a malfunction does not arise in which the hinge portion 22 is undesirably broken or torn away from the container 20. This is because the foregoing power is distributed over the hinge extension 21*a*.

In each of the aforementioned embodiments, the hinge connecting mechanism is constructed such that the hinge extension is formed on the lid. Alternatively, the hinge portion may be formed on the connector housing side while extending in continuation from the hinge portion, without any loss of the advantageous effects of the present invention as noted below.

As is apparent from the above description, according to the present invention, since a hinge extension is formed on a lid or a connector housing with the same small thickness as that of a hinge portion, while extending in continuation from the hinge portion, power applied to the hinge portion in such a manner as to raise up the lid from the connector housing can be distributed over the hinge extension. Consequently, a malfunction does not arise in which the hinge portion is undesirably broken or torn away from the connector housing due to concentration of the power on the hinge portion.

What is claimed is:

1. A hinge connecting mechanism comprising:

a flexible hinge for connecting a housing to a lid in a hinged fashion, and having a predetermined thickness; and an extension portion having an end side which is joined to said hinge such that said extension portion extends therefrom, said extension portion forming part of at least one of said housing and said lid, and having said predetermined thickness, said extension portion being laterally surrounded by portions of said at least one of said housing and said lid except along said end side, wherein said portions of said at least one of said housing and said lid are thicker than the predetermined thickness of said extension portion.

2. A hinge connecting mechanism as claimed in claim 1, wherein said predetermined thickness is thinner than a thickness of said lid.

3. A hinge connecting mechanism as claimed in claim 1, wherein a width of said extension portion is substantially the same as a width of said flexible hinge.

4. A hinge connecting mechanism as claimed in claim 1, wherein said flexible hinge is integrally molded with said extension portion.

5. A hinge connecting mechanism as claimed in claim 1, wherein said flexible hinge is comprised of a plurality of bands.

6. A hinge connecting mechanism comprising:

a connector housing with an opening, said connector housing having an accommodating chamber for accommodating a terminal:

a lid rotatably engaged with said opening;

a flexible hinge, for connecting said connector housing to said lid in a hinged fashion, and having a predetermined thickness being thinner than that of at least one of said connector housing and said lid, said flexible hinge being provided with a hinge portion and an extension portion having an end side which is joined to said hinge portion such that said extension portion extends therefrom, said extension portion forming part of at least one of said housing and said lid, and having said predetermined thickness, said extension portion being laterally surrounded by said at least one of said housing and said lid except along said end side.

7. A hinge connecting mechanism as claimed in claim 6, wherein a width of said flexible hinge portion is substantially the same as a width of said hinge portion.

8. A hinge connecting mechanism as claimed in claim 6, wherein said hinge portion is comprised of a plurality of bands.

* * * * *